United States Patent [19]

Kano et al.

[11] Patent Number: 4,476,271
[45] Date of Patent: Oct. 9, 1984

[54] AQUEOUS DISPERSION TYPE THERMOSETTING COATING COMPOSITION

[75] Inventors: Masafumi Kano, Nagaokakyo; Teruyuki Takahashi, Osaka; Hiroshi Igarashi, Kyoto, all of Japan

[73] Assignee: Dai Nippon Toryo Co., Ltd., Japan

[21] Appl. No.: 443,865

[22] Filed: Nov. 23, 1982

Related U.S. Application Data

[63] Continuation of Ser. No. 261,388, May 7, 1981, abandoned, which is a continuation of Ser. No. 133,738, Mar. 25, 1980, abandoned.

[51] Int. Cl.$^3$ .............................................. C08K 5/06
[52] U.S. Cl. ..................................... 524/377; 523/415
[58] Field of Search ................ 524/377; 523/403, 415, 523/504

[56] References Cited

U.S. PATENT DOCUMENTS 4,156,665  5/1979  Eschwey ............................. 524/377
4,296,014  10/1981 Hayashi ............................... 523/504

Primary Examiner—Michl Paul R.
Attorney, Agent, or Firm—Jacobs & Jacobs

[57] ABSTRACT

Disclosed in an aqueous dispersion type thermosetting coating composition which comprises (i) fine thermosetting powdery resin particles having an average particle size of 5 to 50μ and a softening point of 30° to 120° C., (ii) polyethylene glycol having an average molecular weight of 200–10,000 and (iii) a necessary amount of water.

10 Claims, No Drawings

AQUEOUS DISPERSION TYPE THERMOSETTING COATING COMPOSITION

CROSS-REFERENCE

This is a continuation of Ser. No. 261,388 filed May 7, 1981, abandoned, which is a continuation of Ser. No. 133,738 filed Mar. 25, 1980, abandoned.

BACKGROUND OF THE INVENTION (1) Field of the Invention:

The present invention relates to a novel aqueous dispersion type thermosetting coating composition. More particularly, the present invention relates to an aqueous dispersion type thermosetting coating composition which provides a coating excellent in gloss, smoothness and physical properties without cracking and popping when it is baked and film-formed.

(2) Description of the Prior Art:

Recently, development of paints and coating methods causing no environmental pollution has been desired, and the use of powdery paints and aqueous paints has been expanding steadily. These paints have important characteristics and merits, but they still include various defects and disadvantages as well.

More specifically, the use of powdery paints involves various difficulties. For example, special coating equipment must be used for performing the coating operation when powdery paints are used; hence, the adaptability of powdery paints to the coating operation is much lower than that of conventional solvent type paints. Moreover, coatings formed from these powdery paints are inferior in smoothness and appearance, and it is difficult to form thin coating films having a thickness smaller than $50\mu$.

In the field of aqueous paints of the water-soluble type, since it is impossible to form paints having a high solid concentration, it is impossible to form thick coatings by a single coating operation. Furthermore, because of the presence of a number of hydrophilic groups introduced to render the base resin water-soluble, the durability of the resulting coatings is very poor.

Paints of the aqueous dispersion type, called "latex paints" or "emulsion paints" have long been known (see, for example, U.S. Pat. No. 2,904,523, No. 2,994,676, No. 3,002,940, No. 3,025,252, No. 3,170,888, No. 3,224,542, No. 3,657,175, No. 3,687,885, No. 3,839,254 and No. 3,926,874). In these aqueous latex or emulsion paints, since surface active agents are used in large quantities, the resulting coatings are deficient in water resistance, chemical resistance and the like.

As paints overcoming these defects and disadvantages, there have been developed slurry paints (aqueous dispersion type paints) which are formed by suspending a powdery resin in water and are used in the same manner as aqueous paints.

Paints of this type comprise an aqueous dispersion medium and a particulate resin having a size of about 0.5 to about $80\mu$, which is dispersed in the aqueous medium at a solid concentration of 20 to 70% by weight.

As the coating method for these slurry paints, there can be mentioned, for instance, a method in which the paint is spray-coated on the surface of an aticle to be coated, water is evaporated and the resin component is cured to form a coating (see U.S. Pat. No. 3,787,230) and a method in which an aqueous dispersion of particles of a nylon resin is spray-coated on an article maintained at a temperature higher than 100° C. to form a coating (see U.S. Pat. No. 2,972,552). As known paints to be used for these coating methods, there can be mentioned, for example, (i) a paint comprising particles of a chlorinated polyester resin having a size smaller than 200 mesh, which are dispersed in water (see U.S. Pat. No. 3,089,783), (ii) a paint comprising particles of a chlorinated polyester polymer dispersed in water containing a surface active agent, an ester of a polyhydric alcohol with a lower aliphatic monocarboxylic acid, an alkaline water softener and a lower aliphatic alcohol (see U.S. Pat. No. 3,446,652), (iii) a slurry paint comprising particles of a resin selected from acrylic resins, epoxy resins, polyester resins, amino resins and polyurethane resins and a water-soluble thickener (see U.S. Pat. No. 3,907,737), (iv) a slurry paint comprising as the binder particles of a powder thermosetting acrylic resin (see U.S. Pat. No. 3,904,795), (v) a slurry paint comprising a reactive flow adjusting agent having a specific structure (see U.S. Pat. No. 4,122,055) and (vi) a slurry paint comprising an aqueous medium, resin particles having a size of 0.5 to $80\mu$ and aluminum pigment (see British Pat. No. 1,517,834).

As the process for preparing these slurry paints, there are known a process comprising dissolving a resin in a water-soluble solvent, for example, an alcohol such as methanol or ethanol, a ketone such as acetone or diacetone alcohol, an ester such as ethyl lactate or ethylene glycol monomethyl ether acetate or an ether such as ethylene glycol monoethyl ether, and adding the resulting solution to water being agitated at a high speed to precipitate resin particles in water (see U.S. Pat. No. 3,737,401), and a process comprising pulverizing a solid resin according to an ordinary pulverization method and dispersing the pulverized resin in water.

Slurry paints prepared according to these processes are characterized in that they can be applied at a solid concentration as high as about 40 to about 60% by weight, the coating operation can be accomplished by using a conventional coating apparatus for solvent dilution type paints and the only volatile component contained in the paint is the water that is used as the dispersion medium. Furthermore, since this aqueous dispersion medium contains no soluble component, raw materials can be conserved and environmental pollution prevented. Because of these advantages and merits, it is expected that demand for paints of this type will increase remarkably from now on.

However, the slurry paints having the above described merits still have some defects due to their intrinsic properties.

One of the defects is that the use of a water-soluble thickening agent is inevitable for maintaining a stable aqueous dispersion of powder resin particles (usually about 0.05–1.0 wt. % of water-soluble thickening agent is used) in conventional processes. As a result, the thickening agent inhibits melt fluidization of the resin particles in the step of forming a film under heating. Consequently, smoothness and gloss of the resulting coating film are significantly degraded.

Another defect is that atmospheric humidity has a great influence upon the spray-coating since water is used as the dispersion medium. For example, dry-sprayed film is formed if the humidity is low.

Still another defect is that, since the atmospheric temperature in the step of forming a film under heating is 30°–100° C. higher than the boiling point of water, cracking and popping are apt to occur due to rapid evaporation or boiling of water.

SUMMARY OF THE INVENTION

The present invention relates to an aqueous dispersion type thermosetting resin coating composition. More particularly, the present invention relates to an aqueous dispersion type thermosetting coating composition which provides a coating film excellent in gloss, smoothness and other physical properties without causing cracking or popping when it is formed into a film under heating.

The aqueous dispersion type thermosetting coating composition of the present invention comprises:

(A) 50-70 parts by weight of aqueous medium,
(B) 50-30 parts by weight of a thermosetting powdery resin particles having an average particle diameter of 5-50μ and a softening point of 30°-120° C., and
(C) 0.5-10 parts by weight of polyethylene glycol having an average molecular weight of 200-10,000.

DETAILED DESCRIPTION OF THE PREFERRED EMBODIMENTS

The present invention relates to a novel improved aqueous dispersion type thermosetting resin composition free of the abovementioned defects. More particularly, the present invention relates to an aqueous dispersion type thermosetting resin coating composition having excellent coating workability which provides a coating of an excellent finish, smoothness and gloss without causing cracking or popping.

The term "thermosetting powdery resin particles" herein indicates known theremosetting resin particles which may contain, if necessary, a curing agent, flow modifier, cross-linking agent, catalyst, pigment and other additives.

The softening point of the thermosetting resin is preferably above 30° C. for improving the production efficiency of the resin particles and storage stability of the slurry type paint particularly at abnormally high temperatures and below 120° C. for obtaining a smooth coating surface.

As for the thermosetting mechanism, the resin may be self-curing or cured with a cross-linking agent or a curing agent. Therefore, various thermosetting resins may be used. These resins include, for example, acrylic resin, polyester resin, epoxy resin, alkyd resin, epoxy-modified polyester resin and urethane-modified polyester resin.

In consideration of storage stability, smoothness of coating film and appearance of the finished product, the use of acrylic resin and/or polyester resin is preferred among the abovementioned thermosetting resins.

The cross-linking reaction of these resins or the resin with the curing agent is, for example, a reaction between a hydroxyl group and an alkoxyl group, reaction between a hydroxyl group and isocyanato group, reaction between a hydroxyl group and carboxyl group, reaction between a carboxyl group and epoxy group, self cross-linking reaction of an alkoxyl group, reaction between a carboxyl group and an alkoxyl group and reaction between an epoxy group and an alkoxyl group.

Among the combinations of reactants in the cross-linking reactions, the reactions between a hydroxyl group and carboxyl group, reaction between a hydroxyl group and an alkoxyl group, reaction between a hydroxyl group and isocyanato group, reaction between a carboxyl group and an alkoxy group and a self-cross-linking reaction of an alkoxyl group are preferred. Particularly, combinations wherein a hydroxyl group of polyethylene glycol is subjected to the cross-linking reaction are preferred.

Detailed description will be made on the acrylic resin and/or polyester resin which are/is a preferred thermosetting resin according to the present invention. The acrylic resin is obtained by polymerizing a suitable combination of a functional group-containing monomer and another copolymerizable monomer in an ordinary manner. The polymerization temperature is ordinarily between about 60° C. and about 100° C., and polymerization time is usually within a range of about 3 to about 10 hours. As the functional group-containing monomers, there may be mentioned hydroxyl group-containing monomers such as β-hydroxyethyl acrylate, β-hydroxypropyl acrylate, β-hydroxyethyl methacrylate, β-hydroxypropyl methacrylate, N-methylol acrylamide and N-methylol methacrylamide; carboxyl group-containing monomers such as acrylic acid, methacrylic acid, itaconic acid, maleic acid, fumaric acid, as well as monoesters of maleic acid and fumaric acid with monoalcohols; alkoxyl group-containing monomers such as N-butoxymethylmethacrylamide and N-butoxymethylacrylamide; and epoxy group-containing monomers such as glycidyl methacrylate, glycidyl acrylate and allyl glycidyl ether. As latent isocyanate monomers which regenerate the isocyanato group by heating, there may be mentioned amineimide monomers such as trimethylamine methacrylimide, 1,1-dimethyl-1-(2-hydroxypropyl)amine methacrylimide and 1,1-dimethyl-1-(2,3-dihydroxypropyl)amine methacrylimide; carbamate group-containing monomers such as N-alkenylalkyl carbamates, N-alkenylaryl carbamates, N-alkenylalkyl carbamates and N-styrylalkyl carbamates; and monomers containing a block isocyanto group obtained by reacting hydroxyl group-containing monomers with partial block isocyanates. These monomers may be used either alone or in the form of a combination of two or more of them. The functional group-containing monomer is used in an amount of about 5 to about 40% by weight of total monomers.

As monomers copolmerized with these functional group-containing monomers, there may be mentioned olefinically unsaturated monomers such as ethylene, propylene and isobutylene; aromatic monomers such as styrene, vinyltoluene and α-methylstyrene; ester of (meth)acrylic acid and alcohols of 1-18 carbon atoms such as methyl (meth)acrylate, ethyl (meth)acrylate, propyl (meth)acrylate, n-butyl (meth)acrylate, isobutyl (meth)acrylate, cyclohexyl (meth)acrylate, 2-ethylhexyl (meth)acrylate and lauryl (meth)acrylate; vinyl esters of carboxylic acid of 2-11 carbon atoms such as vinyl acetate, vinyl propionate and vinyl 2-ethylhexylic acid; as well as vinyl chloride, acrylonitrile andmethacrylonitrile. They may be used eiter alone or in the form of a mixture of two or more of them.

It is preferred that the weight average molecular weight of the acrylic resin is about 5,000 to about 50,000.

The polyester resins are obtained by polymerizing polycarboxylic acids with polyhydric alcohols by a known method.

The polymerization temperature is ordinarily between about 200° C. and 270° C., and polymerization time usually within a range of about 5 to about 20 hours.

As the polycarboxylic acids, there may be used, for example, terephthalic acid, isophthalic acid, phthalic anhydride, hexahydrophthalic anhydride, trimellitic anhydride, maleic anhydride and succinic anhydride. As the polyhydric alcohols, there may be used, for example, ethylene glycol, propylene glycol, diethylene glycol, glycerol, trimethylolpropane, trimethylolethane, pentaerythritol and bisphenol A.

It is particularly preferred for improving storage stability to use an aromatic ring-containing polycarboxylic acid and at least 20 we.% of polyhydric alcohol.

The so-formed polyester resin has preferably a number average molecular weight of about 1,000 to 8,000, a hydroxyl value of about 30 to about 300 and an acid value of less than about 50.

As curing agents for these resins, there may be used, for example, alkyl-etherified amino resins obtained by reacting amino compounds such as melamine, urea, benzoguanamine and spiro-guanamine with formalin and treating the reaction products with alcohols of up to 4 carbon atoms such as methanol, ethanol and butanol; blocked isocyanate compounds obtained by blocking all the isocyanate groups of polyisocyanate compounds such as hexamethylene diisocyanate, isophorone diisocyanate and hydrogenated xylene diisocyanate with blocking agents of an oxime series such as methyl ethyl ketoxime, a lactam series such as ε-caprolactam, an alcohol series such as ethylene glycol monoethylether, or an active methylene series such as ethyl acetoacetate; diepoxy compounds such as a condensation product of bisphenol A with epichlorohydrin or methylepichlorohydrin; polycarboxylic acids such as sebacic acid and 1,10-decanedicarboxylic acid; and polyhydric alcohols such as pentaerythritol and trihydroxyethyl isocyanurate.

In the present invention, known flow modifiers such as acrylic oligomers and silicone oil may be added to the thermosetting resins. These known flow modifiers are added to the resin particles preferably in an amount of less than 1 wt. % based on the resin particles so as not to degrade the storage stability of the paint or practical properties of the coating film such as hardness, water resistance and corrosion resistance. It has been found that particularly excellent results are obtained by incorporating 0.5-1 wt. % of a known flow-modifier in the resin particles.

The thermosetting resin particles used in the present invention has an average particle diameter of 5-50μ. If the average particle diameter of 5μ, properties of the particles become close to those of a water-soluble paint, namely, marked flocculation of the particles occurs and foaming is caused in the step of popping film under heating. On the other hand, if the average particle diameter is larger than 50μ, the resin particles are easily precipitated and agglomerated during storage and it becomes impossible to obtain the intended thin, smooth coating, so that, the object of the present invention cannot be attained. It has been found that a paint having good storage stability which provides a smooth coating film free of popping can be obtained from resin particles of an average particle diameter of 7-30μ.

The thermosetting resin particles of the present invention has a softening point of 30°-120° C. The softening point of the resin particles are determined mainly by the softening point of the thermosetting resin. As a matter of course, the softening point of the resin particles is modified slightly by the variety and amount of the curing agent, pigment and other additives.

If the softening point of the resin particles is less than 30° C., even if the particles which have precipitated during the storage are stirred to make the same uniform, the independent particles cannot be completely recovered due to the adhesive properties thereof. On the other hand, if the softening point of the resin particles is higher than 120° C., the resin particles cannot be fluidized or smoothed sufficiently at an ordinary film-forming temperature of 130°-200° C.

The optimum softening temperature is 40°-80° C. Therefore, it is preferred that the amount of components which are not molten at the film-forming temperature of the paint such as a pigment be less than 50 wt. % based on the resin particles.

It is further preferred that additives compatible with the thermosetting resin be selected from those having softening points of 5°-100° C.

The process for the preparation of the fine thermosetting resin particles of the present invention will now be described. A customary mechanical pulverization method or spray-drying method adopted for preparation of conventional powdery paints and slurry paints may be used, but when the softening point of the starting resin composition is low, powdering is difficult according to such a mechanical pulverization method because the stickiness of the resin composition is too high. The following special process, therefore, is advantageously adopted for the preparation of the thermosetting resin particles of the present invention.

At first, predetermined amounts of the thermosetting resin, a curing agent and other film-forming resin, are added to a water-soluble or water-miscible solvent to form a resin solution. If desired, a pigment is incorporated in the solution and kneaded therewith to form a pigment dispersion.

As the solvent, there can be mentioned, for example, alcohols such as methyl alcohol, ethyl alcohol, isopropyl alcohol and n-propyl alcohol; ethylene glycol derivatives such as ethylene glycol monomethyl ether, ethylene glycol monoethyl ether, ethylene glycol monobutyl ether and ethylene glycol monoethyl ether acetate; diethylene glycol derivatives such as diethylene glycol monomethyl ether, diethylene glycol monoethyl ether and diethylene glycol monobutyl ether; esters such as methyl acetate, ethyl acetate and butyl acetate; and ketones such as acetone, methylethyl ketone and methylisobutyl ketone. The amount of the solvent is adjusted so that the non-volatile component content in the solution or dispersion is 30 to 80% by weight.

Then, the so formed resin solution or pigment dispersion is dispersed in the fine particulate state into water in an amount sufficient to dissolve all of the water-soluble or water-miscible solvent contained in the resin solution or pigment dispersion. More specifically, the amount of water is at least 6 times the amount of the resin solution or pigment dispersion based on the weight, and in view of the facility of the subsequent step of filtering the resulting composition, it is preferred that the amount of water be up to about 40 times the amount of the resin solution or pigment dispersion based on the weight.

The dispersion of the resin solution or pigment dispersion may be accomplished according to a method in which the solution or pigment dispersion is dropped and poured into water being violently agitated or a method in which the solution or pigment dispersion is mixed with water by means of a line mixer. When the temperature of the liquid mixture is elevated by agitation and the resin particles are aggregated or sticky by softening of the resins, in order to prevent formation of coarse particles, it is preferred that the liquid mixture be cooled and the temperature be maintained below 30° C.

The above mentioned agitation or mixing by the line mixer is conducted until the solvent in the emulsified fine particles is transferred into water and resin particles are formed. Thus, the solvent contained in the dispersed fine particles is extracted into water to obtain the intended resin particles.

The so formed resin particles are separated from the water-solvent mixture by filtration or centrifugal separation, and if necessary, water washing and separation are repeated several times to obtain the resin particles in the form of a slurry or water-containing cake. Thus, resin particles having preferably an average particle size of about 1 to about 200μ are obtained. Each of the so obtained resin particles includes both the thermosetting resin and curing agent. In other words, the individual resin particles contain cross-linkable functional groups that react with each other under heating. Therefore, when the coating composition of the present invention is heated, a cross-linking reaction is caused both in the respective resin particles and among the resin particles, and a coating having excellent properties can be formed.

Polyethylene glycols used in the present invention are those having an average molecular weight of 200-10,000. If the average molecular weight of the polyethylene glycol is less than 200, its boiling point is low and, in addition, cracks and pops are caused in the coating film because it is volatilized to a considerable amount in the step of forming the film under heating. On the other hand, if the average molecular weight is as high as 10,000 or above, the effect of increasing melt fluidity of the paint at the time of baking is reduced and, consequently, the resulting coating film has a poor smoothness. Polyethylene glycols of an average molecular weight of about 300-6,000 are particularly suitable.

In preparing the composition of the present invention, the polyethylene glycol is used in an amount of 0.5-10 parts by weight based on the sum of the aqueous medium and the thermosetting resin particles. If the amount of the polyethylene glycol is less than 0.5 part by weight, the effects thereof to improve the coating workability and properties of the coating film are insufficient. On the other hand, if it is more than 10 parts by weight, it remains in a significant amount in the coating film to deteriorate water resistance, hardness and stain resistance. It is particularly preferred to use about 1-5 parts by weight of the polyethylene glycol.

The mixing weight ratio of the aqueous medium to the thermosetting resin particles in the present invention is 50-70/50-30.

If the amount of the resin particles in the composition is less than said ratio, the paint will have a low solid content and a low viscosity. Hence, if the paint is applied to an object to an ordinary coating film thickness of, for example, 20-80μ, a sagging phenomenon will be observed in the coating film. To avoid this, it is necessary to repeat the coating several times, and this leads to problems in the coating operation.

If the amount of the thermosetting resin particles in the composition is greater than said ratio, on the other hand, it will be difficult to homogenize the paint even by agitation or kneading and, the viscosity characteristics thereof will be beyond the suitable viscosity characteristics for various coating methods such as spray-coating, electrostatic coating, dip coating, curtain flow coating, shower coating and roll coating methods. Coating workability is poor and the practical value of the paint is low.

A thickening agent may be incorporated in the composition of the present invention so as to improve the storage stability and coating workability of the paint and also to prevent the coating film from sagging during the coating operation.

As the thickening agents usable in the present invention, there may be mentioned those generally used for thickening aqueous paints, for example, organic thickening agents such as alkali salts of carboxyl group-containing acrylic copolymers, polyvinylpyrrolidone, polyacrylamide, cellulose derivatives and polyethylene oxide (molecular weight: greater than 50,000) as well as inorganic thickening agents such as montmorillonite and bentonite. The thickening agent is used preferably in an amount of 0.01-1.0 part by weight per 100 parts by weight of the sum of the aqueous medium and thermosetting resin particles. If the amount is less than 0.01 part by weight, the thickening effect cannot be obtained. If the amount is greater than 1.0 part by weight, on the other hand, there is some improvement in the thickening effect but the thickening agent seriously prevents the melt-flow characteristics of the resin particles with the result that the curing reaction of the resin proceeds prior to the sufficient melting and smoothening of the coating film in the step of forming the film under heating, thus making it impossible to obtain a smooth coating film.

Among the above mentioned thickening agents, the alkali salts of carboxyl group-containing acrylic copolymers are particularly preferred in the present invention, since they are converted into water-insoluble compounds by the reaction with a resin containing hydroxyl group, glycidyl group, isocyanato group or amino group at the time of forming the film under heating, whereby they do not reduce water resistance of the coating film.

For further ensuring storage stability of the aqueous dispersion type thermosetting coating composition of the present invention, up to 1 wt. %, based on the coating composition, of a surface active agent and up to 5 wt. % of a hydrophilic solvent may be added to the coating composition, if necessary.

As the surface active agents, there may be used known nonionic surfactants, anionic surfactants, cationic surfactants and amphoteric surfactants.

As the nonionic surfactants, there may be mentioned, for example, sorbitan fatty acid esters, polyoxyethylene sorbitan fatty acid esters, polyoxyethylene sorbitol fatty acid esters, polyoxyethylene fatty acid esters, polyoxyethylene alcohol ethers, glycerol fatty acid esters, propylene glycol fatty acid esters, polyoxyethylene castor oil derivatives, polyoxyethylene alkyl phenyl ethers, alkyl phosphates and polyoxyethylene phosphates. As the anionic surfactants, there may be mentioned alkyl sulfate salts, polyoxyethylene alkyl ether sulfuric acid ester salts, alkyl sulfosuccinic acid salts and N-acylsarcosine salts. As the cationic surfactants, there may be mentioned quaternary ammonium salts and pyridinium salts.

From the viewpoint of dispersion stability of the thermosetting resin particles and properties of the coating film, nonionic surfactants, particularly those of an HLB of 8-18, are preferred. As the hydrophilic solvents, there may be used those which are usually incorporated in water-soluble paints and slurry paints. Particularly preferred hydrophilic solvents are those of a boiling point of higher than 180° C. in which the resin particles are insoluble at ambient temperature. They include ethylene glycol, diethylene glycol, triethylene glycol, propylene glycol, dipropylene glycol, 1,4-butanediol, 1,3-butylene glycol, hexylene glycol, dipropylene glycol, tripropylene glycol, pentanediol and peptane diol.

If necessary, the coating composition of the present invention may further comprise organic or inorganic coloring or extender pigments customarily used in the field of paints, flash rusting-preventing agents, flow modifiers, defoaming agents, precipitation-preventing agents, antiseptic agents, mildew-proofing agents, and other additives, and film-forming resins such as water-soluble resins, hydrosols and emulsion resins.

If the aqueous dispersion type thermosetting coating composition of the present invention is used, the formation of dry-sprayed film can be prevented by water-retaining properties of the polyethylene glycol even if the atmospheric humidity is low. Another merit of the present invention is that the surface tension of the aqueous medium is reduced by the polyether compound. This makes it possible to improve the wettability of the object with respect to the paint so that the paint can be applied to various objects uniformly and the coating workability of the paint can be improved.

Coating compositions used in the prior art are heated to a temperature above the boiling point of water in the film-forming step, whereby water is rapidly evaporated or boiled thus causing cracks or popping in the coating film. If they contain a thickening agent, the thickening agent inhibits the melt-flow characteristics of the resin particles to seriously degrade smoothness and gloss of the coating film. However, in the coating composition of the present invention, the polyethylene glycol is melted first in the film-forming step under heating and it acts as a solvent for the thermosetting resin. As a result, the melt viscosity of the coating film is reduced and the melt-flow characteristics thereof is increased to prevent the cracking or popping, thereby providing a smooth coating film. Thus, the coating composition of the present invention is advantageous in that the rapid film formation under heating is possible in an atmosphere of a higher temperature.

Various known coating methods such as brush coating, dip coating, spray coating, electrostatic coating, curtain flow coating, shower coating and roll coating methods may be used for coating the aqueous dispersion type thermosetting coating composition of the present invention.

Conditions for heating and curing the coating composition of the present invention after the coating treatment vary to some extent depending on the contents of cross-linkable functional groups contained in the composition, the desired coating thickness and other factors, but ordinarily, a cured coating can be obtained by conducting the heat treatment at an appropriate temperature within the range of from 120° to 200° C. for 10 to 40 minutes.

The cured coating has good coating appearance and gloss. Furthermore, cracking or popping frequently caused when baking is conducted at a high temperature does not occur at all on the case of the coating composition of the present invention, and a cured coating having excellent properties can be obtained.

The present invention will now be described in detail with reference to the following Examples that by no means limit the scope of the invention.

In these Examples, all of "parts" and "%" are by weight.

Prior to the working of the present invention, resins A–D were prepared as follows:

| (1) Resin solution A: | |
|---|---|
| Ethyl acetate | 100 parts |
| Methyl methacrylate | 31 parts |
| Styrene | 32 parts |
| 2-Ethylhexyl methacrylate | 13 parts |
| β-Hydroxyethyl methacrylate | 8 parts |
| Glycidyl methacrylate | 15 parts |
| Methacrylic acid | 1 parts |
| Azobisisobutyronitrile | 3 parts |

A mixture of the above compounds was subjected to a solution polymerization reaction according to a known method to obtain a transparent, viscous resin solution A having an acid value of 7 and a non-volatile content of 50%.

The solvent was removed from the resin solution and the melting point of the residue was measured to reveal that it was 75°–76° C.

| (2) Resion solution B: | |
|---|---|
| Methyl ethyl ketone | 100 parts |
| Methyl methacrylate | 42 parts |
| 2-Ethylhexyl methacrylate | 33 parts |
| 2-Ethylhexyl acrylate | 2.5 parts |
| Styrene | 5 parts |
| 2-Hydroxypropyl methacrylate | 15.5 parts |
| Acrylic acid | 2.0 parts |
| 2,2'-Azobis-(2,4-dimethyl-valeronitrile) | 3 parts |
| Dodecylmercaptan | 1 parts |

A mixture of the above compounds was subjected to a solution polymerization reaction according to a known method to obtain a transparent resin solution B having an acid value of 15.5, hydroxyl value of 60 and a non-volatile content of 50%.

The solvent was removed from the resin solution and the melting point of the residue was measured to reveal that it was 81°–85° C.

| (3) Resin solution C: | |
|---|---|
| Methyl ethyl ketone | 100 parts |
| Methyl methacrylate | 10 parts |
| Styrene | 30 parts |
| Ethyl acrylate | 10 parts |
| Butyl methacrylate | 10 parts |
| Blocked isocyanate group-containing monomer (Note 1) | 25 parts |
| 2-Hydroxyethyl methacrylate | 13 parts |
| Methacrylic acid | 2 parts |
| Azobisisobutyronitrile | 2 parts |
| Dodecylmercaptan | 1 parts |

(Note 1)

Blocked isocyanate group-containing monomer:

A monomer of the following structure synthesized from 1 mole of 2-hydroxyethyl methacrylate, 1 mole of isophorone diisocyanate and 1 mole of cyclohexanone oxime:

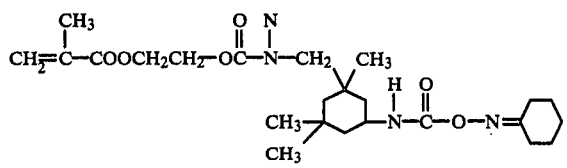

A mixture of the above compounds was subjected to a solution polymerization reaction according to a known method to obtain a transparent, viscous self-cross linking resin solution C having an acid value of 13 and a non-volatile content of 50%. The solvent was removed from the solution and the melting point of the residue was measured to reveal that it was 75°–80° C.

(4) Resin D:

58 parts of terephthalic acid, 50 parts of trimethylolpropane and 37 parts of trimethylhexanediol were subjected to an esterification reaction according to a known method to obtain a polyester resin having an acid value of 16, hydroxyl value of 140 and a melting point of 56°–60° C.

| Titanium dioxide | 29.5 parts |
| --- | --- |
| Resin solution A | 110 |
| 1,10-Decanedicarboxylic acid (curing agent) | 10 |
| Flow modifier (trade name: Modaflow; a product of Monsanto Chemical Co.) | 0.5 |
| Ethyl acetate | 40 |

A mixture of the above components was mixed together homogeneously to obtain a white paint solution. The paint solution was added to 4000 parts of water under agitation at a high speed to disperse the solution in the water in the form of fine particulate droplets and also to transfer the solvent in the water. Then, the mixture of water and solvent was filtered out. The filtration and washing were repeated to obtain a water-containing resin particle cake. From the resin particle cake, an aqueous dispersion type thermosetting coating composition (slurry paint) was prepared according to the following:

| Water-containing resin particle cake (solid content: 56%) | 84 parts |
| --- | --- |
| Polyethylene glycol (average molecular weight: 600) | 1 |
| Nonionic surfactant (trade name: Emalgen #935, a product of Kao Atlas Co., Ltd., HLB 17.5) | 0.3 |
| Bentonite thickening agent (trade name: Bentone: A product of Shiraishi Calusium Co., Ltd.) | 0.1 |
| Water | 16 |

The above components were mixed together homogeneously to obtain an aqueous dispersion type thermosetting coating composition containing resin particles having an average particle diameter of 25μ, and having a solid content of 48.5% and pH value of 7.1. 100 parts of this composition were diluted with 10 parts of water. The diluted composition was sprayed onto an iron plate, pre-heated to 80° C. for 10 minutes and then dried under heating to 160° C. for 20 minutes to form a coating film. The coating film had an excellent smoothness. After the composition was stored in a closed vessel at 50° C. for one week, no precipitation or agglomeration was observed.

EXAMPLE 2

| Resin solution B | 100 parts |
| --- | --- |
| Butylated melamine resin (trade name: Melan 27: a product of Hitachi Chemical Industry Ltd.) | 25 |
| Titanium dioxide | 30 |
| Flow modifier (Modaflow) | 0.63 |

The above components were dispersed homogeneously by means of a sand mill to obtain a white paint solution.

The paint solution was added to 4000 parts of water under agitation at a high speed to effect wet pulverization in the same manner as in Example 1. A water-containing resin particle cake was thus obtained. From the resin particle cake, a slurry paint was prepared according to the following:

| Water-containing resin particle cake (solid content: 55%) | 70 parts |
| --- | --- |
| Polyethylene glycol (average molecular weight: 300) | 5 |
| Nonionic surfactant (trade name: Emasol 4130: a product of Kao Atlas Co., Ltd.: HLB 15.3) | 0.2 |
| Carboxyl group-containing thickening agent (trade name: Acrysol ASE 95: a product of Rohm & Haas Co., solid content 20%) | 1.5 |
| Neutralizing agent (dimethylaminoethanol) | 0.2 |
| Water | 30.0 |

The above components were homogeneously dispersed to obtain an aqueous dispersion type thermosetting coating composition of the present invention containing resin particles having an average particle diameter of 15μ, and having a solid content of 40% and pH value of 8.2. The coating composition having excellent storage stability as in Example 1 was obtained.

The composition was applied to a steel plate which had been treated with zinc phosphate, preheated at 80° C. for 10 minutes and then dried under heating to 140° C. for 20 minutes. The obtained coating film had a thickness of 40μ and excellent smoothness and appearance.

EXAMPLE 3

| Resin solution B | 98 parts |
| --- | --- |
| Blocked isocyanate resin (trade name: Crelan U-I; a product of Bayer A.G.) | 19.0 |
| Dibutyltin dilaurate (dissociation catalyst) | 1.0 |
| Titanium dioxide | 30.0 |
| Flow modifier (trade name: Baysilone PL; a product of Bayer A.G.) | 1.0 |
| Methyl ethyl ketone | 30.0 |

The above components were kneaded together by means of a ball mill to obtain a white paint solution. The paint solution was wet-pulverized in the same manner as in Example 1 to obtain a water-containing resin particle cake. From the resin particle cake, a slurry paint was prepared according to the following:

| Water-containing resin particle cake (solid content: 54%) | 80 parts |
|---|---|
| Polyethylene glycol (average molecular weight: 4000) | 2.0 |
| Surfactant (Emalgen #935) | 0.5 |
| Neutralizing agent (sodium hydroxide) | 0.01 |
| Thickening agent (trade name: Viscoparl EX 180; a product of Takamatsu Oil & Fat Co., Ltd.; solid content: 100%) | 0.1 |
| Water | 20 |

The above components were kneaded together to obtain a white aqueous dispersion type thermosetting coating composition of the present invention containing resin particles having an average particle diameter of 11μ, and having a solid content of 43% and pH value of 7.5. The composition was applied to an iron plate treated with zinc phosphate, pre-heated at 80° C. for 10 minutes and then dried under heating at 180° C. for 20 minutes to obtain a coating film having excellent gloss, smoothness and corrosion resistance.

EXAMPLE 4

A paint and a coating film were formed under the same conditions as in Example 3 except that 3 parts of polyethylene glycol having an average molecular weight of 6,000 was used in place of that having the average molecular weight of 4,000. The resulting coating film had excellent smoothness.

EXAMPLE 5

| Resin solution C | 100 parts |
|---|---|
| Flow modifier (Baysilone PL) | 0.5 |
| Carbon black | 1 |
| Methyl ethyl ketone | 20 |
| Dibutyltin dilaurate | 1 |

The above components were dispersed homogeneously by means of a ball mill and then wet-pulverized to obtain a water-containing resin particle cake. From the resin particle cake, a slurry paint was prepared according to the following:

| Water-containing resin particle cake (solid content: 60%) | 75 parts |
|---|---|
| Polyethylene glycol (average molecular weight: 1,000) | 5 |
| Surfactant (Emalgen #935) | 0.1 |
| Neutralizing agent (dimethylaminoethanol) | 0.2 |
| Thickening agent (trade name: Hiviswako 104; a product of Wako Pure Chemical Industries Co., Ltd.; solid content: 100%) | 0.05 |
| Water | 18.5 |

The above components were kneaded together homogeneously to obtain an aqueous dispersion type thermosetting coating composition of the present invention containing resin particles having an average particle diameter of 11μ and having a solid content of 45% and pH value of 8.8. The composition had excellent storage stability and a coating film obtained therefrom had excellent properties as in Example 5.

EXAMPLE 6

| Resin D | 40 parts |
|---|---|
| Blocked isocyanate resin (Crelan U-I) | 30 |
| Dibutyltin dilaurate (dissociation catalyst) | 1.0 |
| Flow modifier (Modaflow) | 1.0 |
| Titanium dioxide | 30.0 |

A homogeneous mixture of the above components was kneaded and melted by means of a hot roller and then pulverized by means of a hammer mill to obtain a resin particles having an average particle diameter of 25μ. From the resin particles, a slurry paint was prepared according to the following:

| Resin particles | 100 parts |
|---|---|
| Polyethylene glycol (average molecular weight: 2,000) | 3 |
| Surfactant (trade name: Demol N; a product of Kao Atlas Co. Ltd.) | 0.2 |
| Thickening agent (Hiviswako 104) | 0.05 |
| Neutralizing agent (dimethylaminoethanol) | 0.5 |
| Water | 100 |
| Ethylene glycol | 5 |

The above components were mixed together homogeneously to obtain a white aqueous dispersion type thermosetting coating composition of the present invention containing resin particles having an average particle diameter of 25μ, and having a solid content of 50% and pH value of 8.6.

The composition had excellent storage stability and a coating film obtained therefrom had excellent smoothness and corrosion resistance.

EXAMPLE 7

A coating composition and a coating film were formed in the same manner as in Example 5 except that 5 parts of polyethylene glycol having an average molecular weight of 200 was used in place of that having the average molecular weight of 1000.

The resulting coating film had a quite excellent smoothness.

EXAMPLE 8

A coating composition and a coating film were formed in the same manner as in Example 6 except that 3 parts of polyethylene glycol having an average molecular weight of 10,000 was used in place of that having the average molecular weight of 2000.

The resulting coating film had quite excellent smoothness and flexibility.

COMPARATIVE EXAMPLE 1

A slurry paint was prepared in the same manner as in Example 1 except that polyethylene glycol was omitted. From the paint, a coating film was formed in the same manner as in Example 1. The resulting film had inferior smoothness and flexibility.

COMPARATIVE EXAMPLE 2

A slurry paint was prepared in the same manner as in Example 2 except that average particle diameter of the resin particles was 3μ. From the paint, a coating film was formed in the same manner as in Example 2. Popping occurred in the coating film and the film had an insufficient thickness. Thus, a practical coating film could not be obtained.

COMPARATIVE EXAMPLE 3

A slurry paint was prepared in the same manner as in Example 3 except that the polyethylene glycol was replaced with the same amount of a compound of an average molecular weight of 20,000. From the paint, a coating film was formed in the same manner as in Example 3, which had inferior smoothness.

COMPARATIVE EXAMPLE 4

A paint hand a coating film were formed in the same manner as in Example 4 except that polyethylene glycol was used in an amount of 0.2 part. The coating film had inferior smoothness.

COMPARATIVE EXAMPLE 5

A paint and a coating film were formed in the same manner as in Example 1 except that polyethylene glycol was replaced with the same amount of triethylene glycol. The resulting coating film had a smoothness inferior to that in Example 1.

COMPARATIVE EXAMPLE 6

A paint and a coating film were formed in the same manner as in Example 3 except that polyethylene glycol was used in an amount of 15 parts. The coating film had an inferior water resistance.

COMPARATIVE EXAMPLE 7

A paint and a coating film were formed in the same manner as in Example 6 except that the average particle diameter of the resin particles was 60μ. The paint had an inferior storage stability and the coating film had an insufficient smoothness.

Results of tests on properties of the paints and coating films formed in the above examples and comparative examples are shown in Table 1.

(Note 1) Visual judgement from disorder of a reflected image on the surface of the coating film by means of luminescent lamp.
O: good
Δ: relatively poor
X: poor
(Note 2) 60° specular reflectance
(Note 3) After application, the coating was dried at a temperature 5°–10° C. lower than the film-forming temperature of the resin particles to form cracks in the coating film. Degree of filling up of the cracks after the film formation under heating was judged visually.
O: good
Δ: trace of cracks
X: cracks through the full depth of the film.
(Note 4) Minimum thickness of film in which popping was recognized visually (μ)
(Note 5) According to the specification of JIS K 5400.
(Note 6) Du Pont impact tester (½ inch × 500 g)
(Note 7) Cross-cut adhesion tape peeling test.
(Note 8) The minimum thickness (represented by dry film thickness) of a continuous coating film which can be formed by spray-coating of a polished steel plate with a paint having a 37% solid content.
(Note 9) The coated plate was immersed in boiling water for one hour, then allowed to stand for one hour and subjected to the cross-cut adhesion tape peeling test.

What we claim is:

1. An aqueous dispersion type thermosetting coating composition consisting essentially of
   (a) 50–70 Parts by weight of an aqueous medium,
   (b) 50–30 parts by weight of thermosetting powdery resin particles dispersed in said aqueous medium, said resin particles having an average particle diameter of 50–50μ and a softening point of 30°–120° C. and containing therein at least one thermosetting resin selected from the group consisting of acrylic resin, polyester resin and epoxy resin and at least one one curing agent having cross-linkable functional groups that are operable to react with said thermosetting resin when said particles are heated, said curing agent being selected from the group consisting of blocked isocyanate compound, diepoxy compound and polycarboxylic acid, and

TABLE 1

| | Examples | | | | | | | | Comparative Examples | | | | | | |
|---|---|---|---|---|---|---|---|---|---|---|---|---|---|---|---|
| | 1 | 2 | 3 | 4 | 5 | 6 | 7 | 8 | 1 | 2 | 3 | 4 | 5 | 6 | 7 |
| Smoothness (Note 1) | O | O | O | O | O | O | O | O | X | O | Δ | Δ | Δ | O | Δ |
| Gloss (Note 2) | 93 | 90 | 94 | 93 | 92 | 94 | 90 | 93 | 86 | 90 | 87 | 86 | 88 | 92 | 89 |
| Cracks (Note 3) | O | O | O | O | O | O | O | O | X | O | Δ | Δ | Δ | O | Δ |
| Popped film thickness (Note 4) | 100< | 45 | 100< | 100< | 60 | 100< | 55 | 100< | 55 | 30 | 60 | 40 | 55 | 100< | 100< |
| Bending property (Note 5) | 6 | 6 | 6 | 6 | 6 | 6 | 8 | 3 | 10 | 6 | 6 | 10 | 10 | 6 | 6 |
| Impact strength (Note 6) | 50< | 35 | 35 | 40 | 35 | 50< | 30 | 50< | 30 | 35 | 35 | 20 | 35 | 50< | 50< |
| Adhesion properties (Note 7) | 100 | 100 | 100 | 100 | 100 | 100 | 100 | 100 | 100 | 100 | 89 | 100 | 100 | 100 | 100 |
| | 100 | 100 | 100 | 100 | 100 | 100 | 100 | 100 | 100 | 100 | 100 | 100 | 100 | 100 | 100 |
| Minimum film thickness (Note 8) | 18 | 15 | 17 | 15 | 20 | 20 | 20 | 20 | 25 | 10 | 25 | 20 | 25 | 15 | 30 |
| Adhesion properties after immersion in boiling water (Note 9) | 100 | 100 | 100 | 100 | 100 | 100 | 100 | 95 | 100 | 100 | 85 | 100 | 100 | 50 | 100 |
| | 100 | 100 | 100 | 100 | 100 | 100 | 100 | 100 | 100 | 100 | 100 | 100 | 100 | 100 | 100 |

(c) 0.5–10 parts by weight of polyethylene glycol having an average molecular weight of 200–10,000 in said aqueous medium.

2. An aqueous dispersion type thermosetting coating composition according to claim 1, wherein the resin particles have an average particle size of 7 to 30μ.

3. An aqueous dispersion type thermosetting coating composition according to claim 1, wherein said polyethylene glycol has an average molecular weight of 300 to 6000.

4. An aqueous dispersion type thermosetting coating composition according to claim 1, containing a pigment.

5. An aqueous dispersion type thermosetting coating composition according to claim 1, wherein the thermosetting powdery resin particles are at least one member selected from the group consisting of acrylic resin and polyester resin particles.

6. An aqueous dispersion type thermosetting coating composition according to claim 1, wherein the thermosetting powdery resin particles contain 0.5–1 wt. % of a flow modifier.

7. A aqueous dispersion type thermosetting coating composition according to claim 1, wherein the aqueous medium contains 0.01–1.0 wt. %, based on the total of the aqueous medium and the thermosetting powdery resin particles, of a water-soluble thickening agent.

8. An aqueous dispersion type thermosetting coating composition according to claim 1, further containing up to 1 wt. % of a surfactant.

9. An aqueous dispersion type thermosetting coating composition according to claim 1, further containing up to 5 wt. % of a hydrophilic solvent having a boiling point higher than 180° C. in which the thermosetting powdery resin particles are insoluble at ambient temperature.

10. An aqueous dispersion type thermosetting coating composition consisting essentially of
(a) 50–70 parts by weight of an aqueous medium.
(b) 50–30 parts by weight of thermosetting powdery resin particles dispersed in said aqueous medium, said resin particles having an average particle diameter of 5–50μ and a softening point of 30°–120° C., each of said resin particles containing therein at least one thermosetting resin selected from the group consisting of acrylic resin, polyester resin obtained by polymerizing a polymerizate consisting essentially of polycarboxylic acid and polyhydric alcohol, and epoxy resin, and at least one curing agent having cross-linkable functional groups that are operable to react with said thermosetting resin when said particles are heated, said curing agent being selected from the group consisting of blocked isocyanate compound, diepoxy compound and polycarboxylic acid, and
(c) 0.5–10 parts by weight of polyethylene glycol having an average molecular weight of 200–10,000 in said aqueous medium.

* * * * *